May 5, 1959 A. J. DEVAUD 2,885,229

MECHANICAL COUPLING DEVICES

Filed Jan. 3, 1955 2 Sheets-Sheet 1

INVENTOR
ALBERT J. DEVAUD
BY Elmer J. Gorn
ATTORNEY

MECHANICAL COUPLING DEVICES

Filed Jan. 3, 1955 2 Sheets-Sheet 2

INVENTOR
ALBERT J. DEVAUD
BY Elmer J. Gorn
ATTORNEY

United States Patent Office 2,885,229

Patented May 5, 1959

2,885,229

MECHANICAL COUPLING DEVICES

Albert J. Devaud, Waltham, Mass., assignor, by mesne assignments, to Minneapolis-Honeywell Regulator Company, a corporation of Delaware Application January 3, 1955, Serial No. 479,476

4 Claims. (Cl. 287—52)

This invention relates to a coupling device, and more specifically to a self-aligning and self-locking device for placing a first member, such as a reel hub, in a unique position with respect to a second member, such as a driving member.

In modern high speed computers using magnetic tapes, there is a mode of operation that requires intermittent motion of said magnetic tape. It is often desirous in different applications to use the tape as a memory-storage device wherein said tape is stopped and started many times a second in order to read-in or read-out the information stored in said tape. Accurate performance of the tape driving mechanism is dependent on the precision with which the magnetic tape is placed on the take-up and supply reel. The reel hub, which the tape rides on, must be uniquely located with respect to the driving member for both the supply and take-up reels. For many commercial applications it is often necessary to use a plurality of tapes, each containing different information necessary for the solution of a problem. In operating the computer, it is often necessary that these different tapes be placed on and off the tape driving mechanism with great speed by relatively unskilled personnel. Time economy requires rapid starting and stopping of the tape, resulting therefore in high acceleration and deceleration forces, which in turn demand a connection between drive and reel that is free of any backlash. High flexibility of operation also imposes a demand for quick and easy replacement of the tape.

Heretofore various coupling means have been used, such as a key and keyway, and a splined shaft and splined reel hub. The difficulty with these devices was that when the mating surfaces were constructed accurately enough to satisfy the requirements of no backlash, and of always occupying the same unique relationship to each other, it was a difficult job requiring time, effort, and often special tools, to replace or remove a reel hub.

In order to achieve a unique relationship in space between two members, the first member is placed in contact with the second member at six contacting points fixedly positioned with respect to each other. Three of the contacting points lie in a first plane, while the remaining three contacting points lie in a second plane. In this manner, the first member, henceforth to be called a reel hub, can be removed and replaced on a second member, henceforth to be called a driving member in the same unique relationship by causing said reel hub to contact said driving member in the manner just described.

Further objects and advantages of this invention will be apparent as the description progresses, reference being made to the accompanying drawings wherein.

Figures 1, 3, 6:
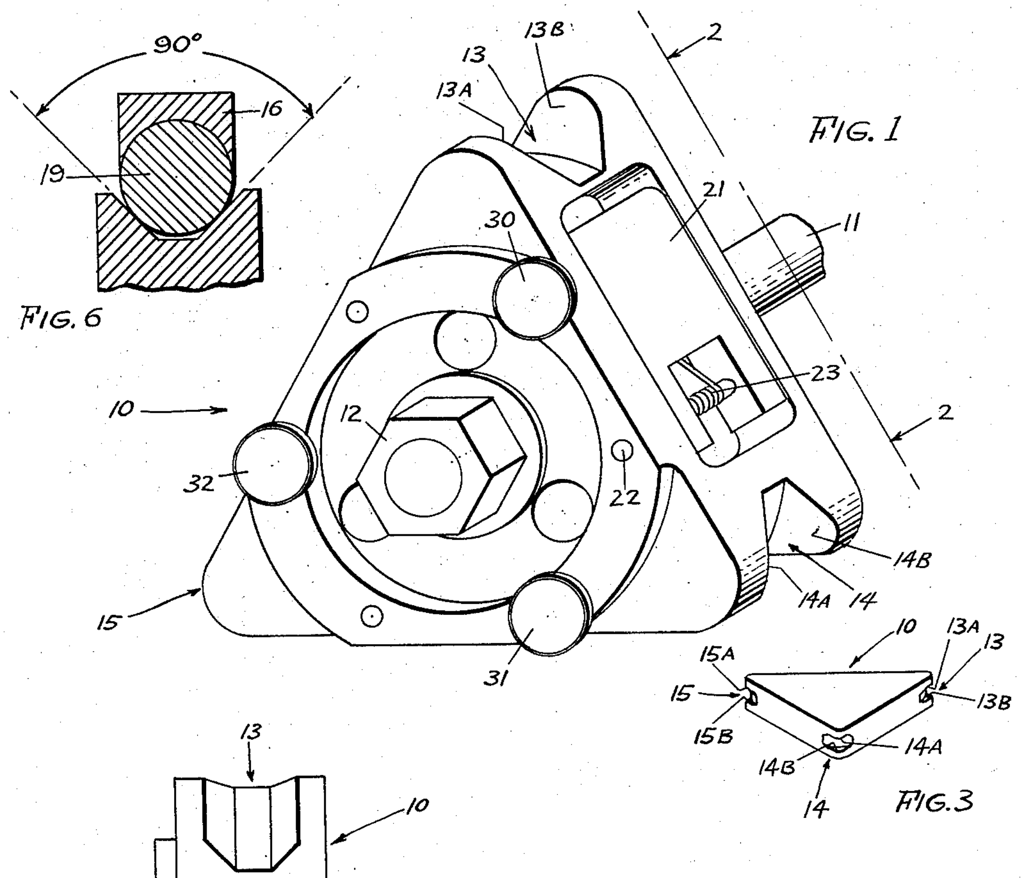
Fig. 1 is an oblique drawing of a driving member constructed in accordance with the principles of this invention.
Fig. 3 is another view of the driving member illustrated in Fig. 1.
Fig. 6 is cross section 6—6 of Fig. 4.
Figure 2:
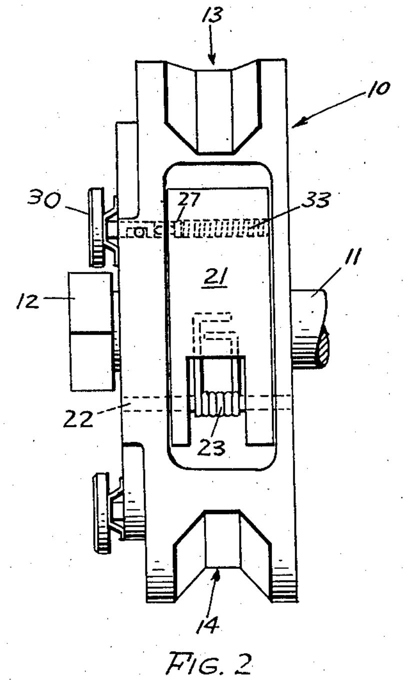
Fig. 2 is a section 2—2 of Fig. 1.

Referring now to Figs. 1, 2 and 3, there is shown a driving member 10 constructed in accordance with the principles of this invention. Driving member 10 is connected to and driven by shaft 11. Lock nut 12 which is threaded on the external portion of shaft 11 fixedly connects driving member 10 and shaft 11 together. Driving member 10 is constructed in the form of an equilateral triangle of preferably hardened metal in order to withstand the high pressures caused by high positive and negative accelerations generated in such equipment. The apex of all three triangulated sections of driving member 10 have a V-shaped cross-section 13, 14 and 15. Each V-groove consists of two rectilinear surfaces 13A, 13B, 14A, 14B, 15A and 15B, thereby making a total of six surfaces. The angle formed by each of the V-grooves 13, 14 and 15 has been made approximately 90 degrees in the prefererd embodiment. It should be understood that the angle formed by V-grooves 13, 14 and 15 surfaces. The angle formed by V-grooves 13, 14 and 15 is not critical to the invention, but is chosen on the basis of size, speed and load of the specific embodiment. The exact shape of driving member 10 has been made in the form of an equilateral triangle, wherein each apex of the triangle is spaced approximately 60 degrees from each other for the purpose of interchangeability between co-mating parts located in reel hub 16.

Figure 5:
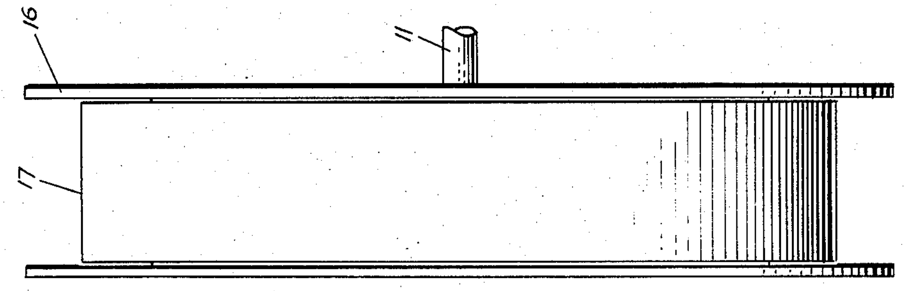
Fig. 5 is section 5—5 of Fig. 4.
Figure 4:
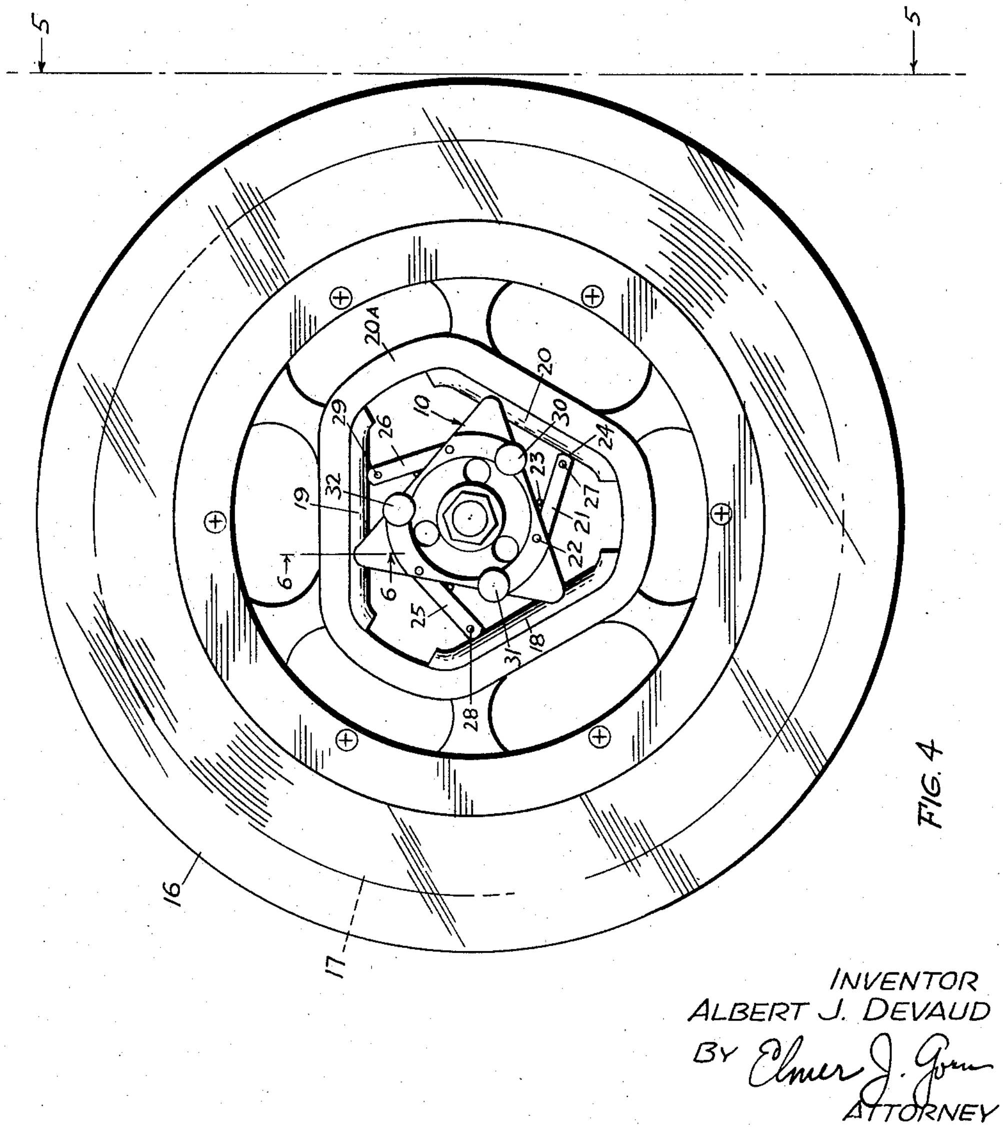
Fig. 4 is a front view of a reel hub constructed in accordance with the principles of this invention, shown in the normal operating position on the driving member that is illustrated in Fig. 1.

Referring now to Figs. 4, 5, and 6, there is shown a reel hub 16 on driving member 10 in the normal operating position. The purpose of reel hub 16 is to hold a magnetic tape 17. In modern high-speed computers, magnetic tapes are used as a means of storing information. In such devices, the magnetic tape must be capable of rotating in both directions, stop and start rapidly, and be capable of being removed from the driving mechanism with great speed. In addition to the above requirements, it is imperative that each tape when replaced on the driving mechanism occupy the same unique relationship.

The construction of reel hub 16 and driving member 10 according to this invention satisfies the requirements of no backlash, always occupying a unique relationship to each other, maximum interchangeability between parts, and easy removal and replacement of the reel hub to the driving member.

The hub or central opening in reel hub 16 is constructed in the form of an equilateral triangle, wherein cylindrical surfaces 18, 19, and 20 form the sides of said triangle. The shape of the opening in reel hub 16 is determined by the shape of driving member 10. The triangle formed by surfaces 18, 19, and 20 must be large enough to allow driving member 10 to be inserted therein, but also small enough to allow a small rotation of driving member 10 to cause V-grooves 13, 14, and 15 to contact surfaces 18, 19 and 20 at some point other than the tangential point of contact. Surfaces 18, 19, and 20 are constructed of a hardened metal having a cylindrical cross section. Said surfaces, 18, 19, and 20 are welded to member 20*a*, which forms the central opening for reel hub 16. It will be noted that since surfaces 18, 19, and 20 are cylindrical in cross section, and also that since surfaces 18, 19, and 20 form an equilateral triangle, that contact with these surfaces by rectilinear surfaces 13A, 13B, 14A, 14B, 15A and 15B will occur at six specific points; and also that contact between the reel hub 16 and driving member 10 will always be made at these same six contacting points, thereby uniquely defining reel hub 16 with respect to driving member 10. It will also be observed that the three points of contact between 13A, 14A, and 15A and surfaces 18, 19, and 20, lie in a first plane, while the points of contact between 13B, 14B, and 15B and surfaces 18, 19, and 20 lie in a second plane.

In order to lock reel hub 16 to driving member 10, it is only necessary to provide a preloading member. This is accomplished by having a lever 21, which has a fulcrum at point 22 on driving member 10, forced open by the action of a torsional spring 23, thereby causing lever 21 to contact the reel hub at a point 24. Lever 21 will therefore allow shaft 11 to rotate in either direction, as long as the angle formed by lever 21 and driving member 10 makes an angle smaller than the maximum value determined by the coefficient of friction between the lever 21 and the respective bearing surface 24. It will be apparent to those skilled in the art that if this were not so, then under certain conditions of acceleration, or deceleration, the contact pressure between the six contacting points could be reduced to zero, leaving driving member 10 and reel hub 16 having contact at only a single point 24. The pressure at point 24 must always be great enough to maintain contact pressure at the six contacting points between reel hub 16 and driving member 10. Additional levers 25 and 26 merely increase the capacity of reel hub 16 to accept a higher value of acceleration and deceleration forces.

Figs. 2 and 4 illustrate driving member 10 with lever 21 in a closed position. Figs. 4 and 5 show spring-loaded pins 27, 28, and 29 built into the ends of each lever 21, 25, and 26, respectively, at a point opposite unlocking buttons 30, 31, and 32 when said levers are in their normally closed position. Pressing unlocking button 30 causes pin 27 to be depressed against the action of compressional spring 33, which, in turn, causes lever 21 to be opened under the action of torsion spring 23. Since all three levers are constructed identically, the same result would occur to each lever if its corresponding button were depressed.

The basic principle of this invention is that two bodies can always be placed in a unique relationship to each other if these two bodies are made to contact each other at six contacting points, three of which lie in a first plane and three of which lie in a second plane.

This invention utilizes the principle that six locating points, three of which lie in a first plane, and three of which lie in a second plane, can be used to insure a unique location of a reel hub, with respect to a driving member, and that in addition, a restraining member and a force are used to fixedly position said reel hub with respect to said driving member.

This completes the description of the embodiment of the invention illustrated herein. However, many modifications and advantages thereof will be apparent to persons skilled in the art without departing from the spirit and scope of this invention. For example, it is not necessary to have three preloaded levers or even two, since as it was mentioned previously, one lever is sufficient. Since the lever only supplies a force and in no way determines the unique position of guiding member 10 with respect to reel hub 16, any number of levers may be used. The number of levers is dependent only upon the external forces that the reel hub might be subjected to. The unique locating qualities of driving member 10 and reel hub 16 are not dependent on any specific shape of the surfaces contacting these two members. It has been shown that the unique locating qualities depend on the six contacting points, as previously defined. It should be obvious that any geometrically compatible pair of convex and concave surfaces between driving member 10 and reel hub 16 will produce the same desired result. Accordingly, it is desired that this invention not be limited to the particular details of the embodiments as described herein, except as defined by the appended claims.

What is claimed is:

1. In combination, a first member and a second member formed to complete a mechanical coupling by engaging each other at predetermined points, said first member having three surfaces spaced approximately 60 degrees from each other, each of said three surfaces having a V-shaped cross-sectional area extending radially from a central axis and equidistantly spaced therefrom, the sides of said V-shaped area being constructed rectilinear, said second member having three straight co-mating surfaces each of which are circular in cross section, and means for contacting each rectilinear surface in each V-shaped area of said first member against a point on the circular surface of said co-mating surface of said second member, thereby making a total of six contacting points between said first and second members.

2. In combination, a first member and a second member formed to complete a mechanical coupling by engaging each other at predetermined points, said first member having three surfaces spaced approximately 60 degrees from each other, each of said three surfaces having a V-shaped cross-sectional area extending radially from a central axis, the sides of said V-shaped area being constructed rectilinear, said second member having three straight co-mating surfaces each of which are circular in cross section, means for contacting each rectilinear surface in each V-shaped area of said first member against a point on the circular surface of said co-mating surface of said second member, thereby making a total of six contacting points between said first and second members, and resilient means for maintaining a contact pressure between said first member and said second member.

3. In combination, a first member and a second member formed to complete a mechanical coupling by engaging each other at predetermined points, said first member having a plurality of concave grooves extending radially from a central axis and each having flat tapered sides and being fixedly positioned with respect to each other in a single plane, said second member having a corresponding plurality of convex surfaces having a semi-cylindrical cross-section with the diameter thereof being greater than the narrowest portion of said concave grooves and being fixedly positioned with respect to each other in said plane, and means for contacting each of said plurality of concave grooves of said first member on the tapered sides thereof against each of said plurality of convex surfaces of said second member on the cylindrical portion thereof at two contacting points, thereby making a total of contacting points between said first and second member of twice the said plurality of grooves of said first member.

4. A mechanical coupling comprising a first member and a second member adapted to be mechanically coupled to said first member for mechanical rotation about an axis, said first member having a plurality of projections thereon extending laterally therefrom about said axis in a plane which is at right angles with respect to the rotating axis and a groove having tapered flat sides cut in the outer end of each of said projections, said second member having an opening therein with a plurality of straight elements within the opening and each having an exposed arcuate surface formed on the inner surface of said opening, each of said arcuate surfaces being positioned to engage the tapered sides of a corresponding groove in a projection on said first member, and resilient means biasing all of said arcuate surfaces into engagement with corresponding ones of the grooves of said first member.

References Cited in the file of this patent

UNITED STATES PATENTS

| | | |
|---|---|---|
| 1,138,399 | Nicol | May 4, 1915 |
| 1,424,211 | Pugh | Aug. 1, 1922 |
| 2,448,213 | Doonan | Aug. 31, 1948 |
| 2,491,976 | Hauser | Dec, 20. 1949 |

FOREIGN PATENTS

| | | |
|---|---|---|
| 140,364 | Sweden | May 12, 1953 |